(No Model.)  2 Sheets—Sheet 1.
C. B. GARDINER.
MATCH MAKING MACHINE.
No. 270,783. Patented Jan. 16, 1883.
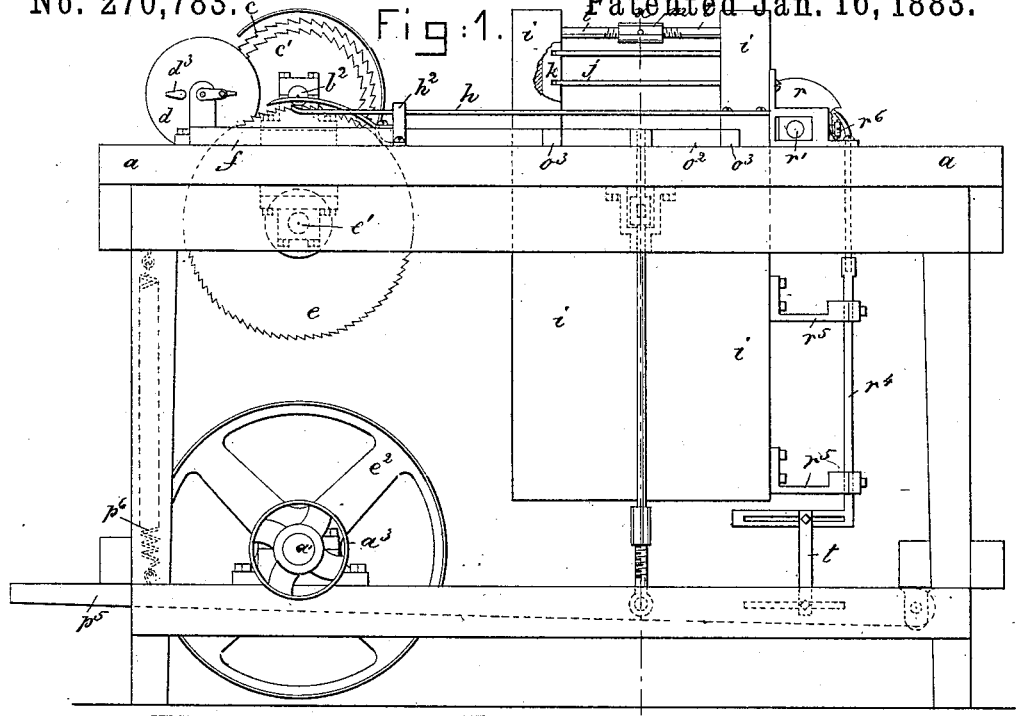
Fig. 1.
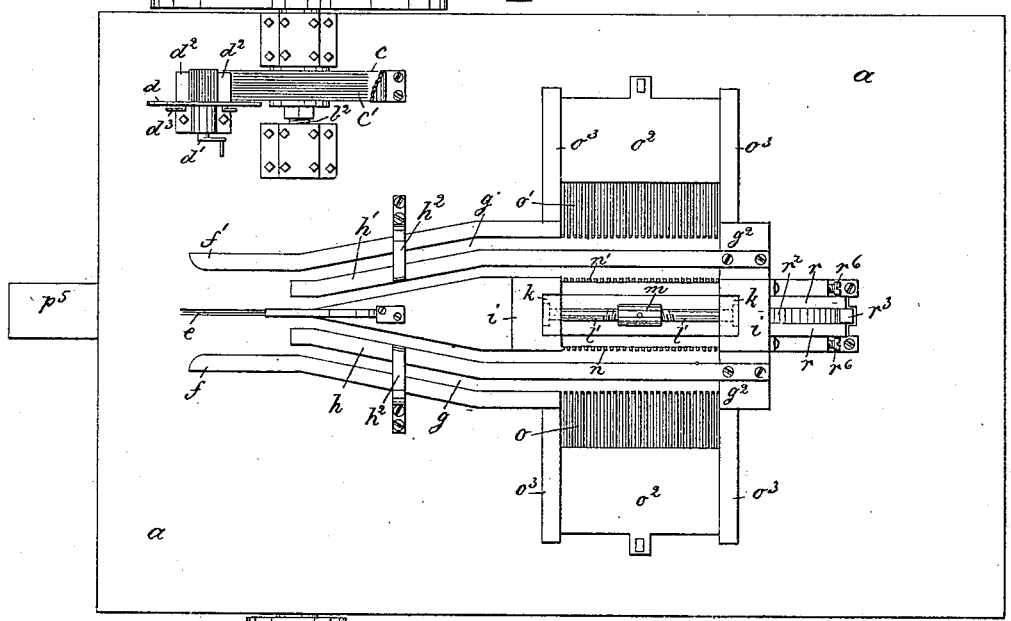
Fig. 2.
Witnesses 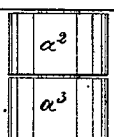
Fred A. Prindl
John F. C. Preinkert
Inventor.
Charles B. Gardiner
by Crosby & Gregory attys.
N. PETERS, Photo-Lithographer, Washington, D. C.

(No Model.) 2 Sheets—Sheet 2.
C. B. GARDINER.
MATCH MAKING MACHINE.
No. 270,783. Patented Jan. 16, 1883.
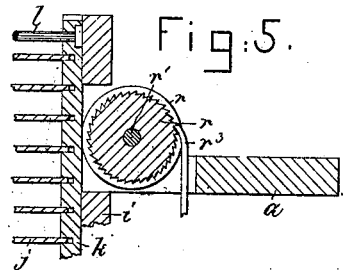
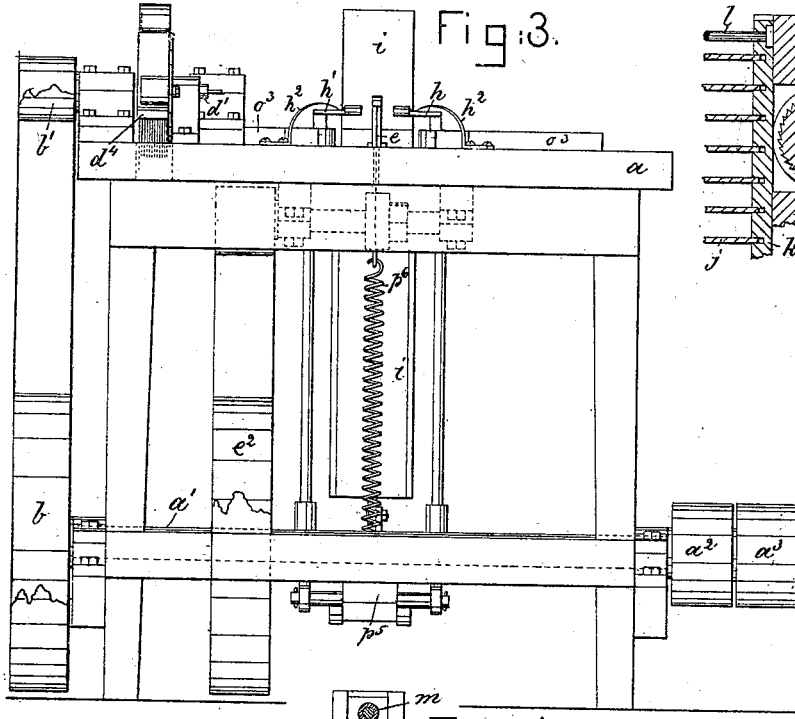
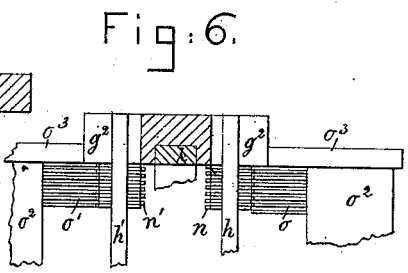
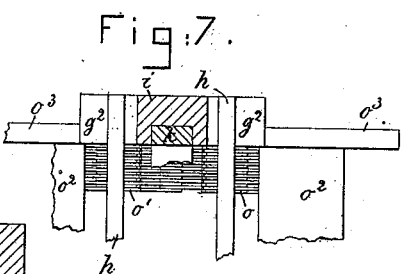
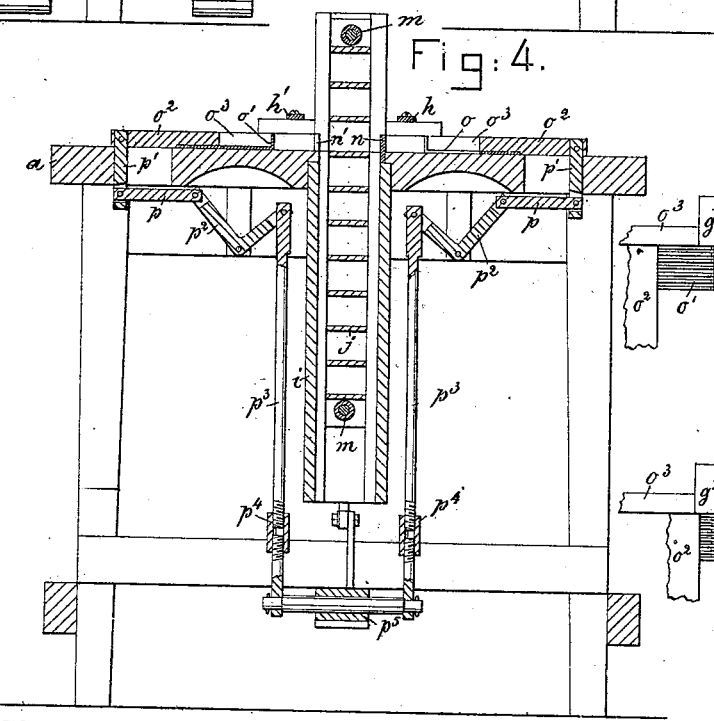
Witnesses
Fred A. Powell
John F. C. Printert
Inventor
Charles B. Gardiner
by Crosby & Gregory attys.

UNITED STATES PATENT OFFICE.

CHARLES B. GARDINER, OF RAYNHAM, ASSIGNOR OF ONE-HALF TO LEEDS, ROBINSON & CO., OF BOSTON, MASSACHUSETTS.

MATCH-MAKING MACHINE.

SPECIFICATION forming part of Letters Patent No. 270,783, dated January 16, 1883.

Application filed October 4, 1882. (No model.)

*To all whom it may concern:*

Be it known that I, CHARLES B. GARDINER, of Raynham, county of Bristol, State of Massachusetts, have invented an Improvement in Match-Making Machines, of which the following description, in connection with the accompanying drawings, is a specification.

My invention relates to a machine for making matches, and has for its object to produce a single organized machine by which the card-blanks are sawed and automatically placed in racks, ready for dipping. The frame-work of the machine has the general appearance of a table, carrying at one side a gang of saws for splitting the cards of matches into individual matches, the card-blanks each being of the proper size to make two cards of the finished matches. The said card-blanks, when split or divided by the gang of saws at each end, are sawed apart in the middle by a crosscut-saw arranged near the middle of the table and provided with suitable guides for presenting the card-blanks to be thus separated by the said saw. The said card-blanks are presented to the saw in a position at right angles to the table, they resting on their edges upon the said table, and guideways are provided leading from either side of the saw to convey the separated cards to the racking apparatus. A yielding pressure rests on the upper edge of the cards, and holds them with a moderate friction between the said presser and table as they are conveyed along in the guideways. The said guideways at either side of the saw diverge and include between them the rack guide or pit, in which a rack consisting of a series of shelves of sufficient width to contain cards of matches placed edgewise between them has a vertical movement. The said guideways for the cards terminate in line with one edge of the rack, and after the cutting-off saw has been operated a sufficient time the guideways at either side of the rack are completely filled with a column of cards of matches packed closely together. A series of stop projections are placed between the rack and the said column of cards of matches in the guideways, they being placed opposite every alternate card, and those upon one side of the rack being located opposite the spaces of those on the other side. Plungers are placed at either side of the columns in the said guideways, movable in guides transverse to the said column toward the rack, and arranged to engage the alternate cards which are not engaged by the stopping devices, so that by the simultaneous operation of the plungers at both sides the alternate cards from the columns on each side are thrust into the rack, those from each side being placed between those from the other side, so that the shelf of the rack thus filled by a movement of the plungers contains a series of cards of matches projecting out at either side. A rack-feeding mechanism is actuated by the plunger-operating mechanism, it feeding the rack along upon the return-stroke of the plungers, so as to present a new shelf in line with the column of match-cards, so that as soon as sufficient card-blanks are sawed apart to again fill the guideways another operation of the plungers will fill the next shelf of the rack, and upon the return movement of the plungers place the rack in position to have a succeeding shelf filled. The operation goes on until the entire rack is filled, when its hold upon the matches racked therein is increased by the operation of the clamps for this purpose. The machine may by some modifications be used for making parlor-matches, or matches in which each separate splint is independently provided with the igniting composition.

Figure 1 is a side elevation of a match-making machine embodying this invention. Fig. 2 is a plan view thereof; Fig. 3, a front elevation; Fig. 4, a transverse section on line $x\ x$, Fig. 1; Fig. 5, a detail of the rack-feeding mechanism, and Figs. 6 and 7 enlarged details of the plungers by which the matches are placed in the racks.

The main frame-work or table $a$ is provided with a main shaft, $a'$, having the usual fast and loose pulleys, $a^2\ a^3$. The said shaft $a'$ is also provided with a pulley, $b$, connected by a belt with the pulley $b'$ on the arbor $b^2$ of a gang of saws, $c\ c'$, for splitting the cards into individual matches. The said cards are presented to the said saws by a card-holding device or chuck, which will form the subject of another application for Letters Patent, it consisting essentially of a plate, $d$, mounted on an arbor, $d'$, and provided with clamping-jaws $d^2$, one or both of which is made movable toward the other by a handled eccentric, $d^3$, to clamp a bunch of double card-blanks between them, the rear ends of the said blanks resting against the guide $d^4$, (see Fig. 3,) having the same curvature as the gang of saws $c'$, so as to cut all the card-blanks to the same depth as the said card-feeding device is rotated on its arbor $d'$, to carry the projecting ends of the cards against the teeth of the gang of saws. The saw $c$ is made of larger diameter than the others to trim off the edge of the card-blanks, so as to make them all of uniform width. The card-blanks, having thus been split, are presented to the cutting-off saw $e$, mounted on an arbor, $e'$, below the table, and actuated by a pulley, $e^2$, on the main shaft $a'$. The said cards have their position relative to the cutting-off saw $e$ gaged by guides $f f'$ upon the table $a$, the said cards standing edgewise on the said table. The said guideways $f f'$ are continued backward from the saw and form one wall of guide-passages $g g'$—one at each side of the saw—into which the separated cards are carried, they being pressed forward by the introduction of fresh ones to the guides $f f'$ for the cutting-off saw $e$. The cards are steadied or held in place in the guideways $g g'$ by the yielding pressers $h h'$, shown as thin strips of metal pressed downward toward the table by springs $h^2$. The said guideways $g g'$ diverge from one another to receive between them a pit or guide, $i$, for the rack, consisting of a series of shelves, $j$, included between side bars, $k$, connected at their ends by bolts $l l'$, having a right-and-left-threaded nut, $m$, by which they may be drawn together upon the cards of matches inserted between the shelves $j$. The said rack is held with one of its shelves even with the top of the table $a$ and in line with the column of cards of matches in the guideways $g g'$, the said column being stopped by the end walls, $g^2$, when even with the end of the shelves $j$ of the rack. Between the said column of match-cards and the rack are a series of stop projections, $n n'$, in line with the alternate cards of each column, the projections on one side of the rack-pit being opposite the spaces between the projections on the other side.

Series of plungers $o o'$, each connected with a plunger-head, $o^2$, moving in guides $o^3$, transverse to the guideways $g g'$, engage the alternate cards of matches which are opposite the spaces between the stop projections $n n'$ on the same side of the rack with the said plungers $o o'$, so that when the said plungers are moved toward the rack, as shown in Fig. 7, they convey every alternate card on each side into the space between the shelves $j$ of the rack, the said cards introduced from either side being interlocked or inserted in the spaces between those on the other side, as shown in Fig. 7. The plunger-heads are moved forward simultaneously to thus convey the cards into the rack by the plunger-actuating mechanism, (best shown in Fig. 4,) consisting of links $p$, connected with arms $p'$, extending down from the said plunger-heads through slots in the table, the said links $p$ being each connected with one arm of an elbow-lever, $p^2$, the other arm of which is connected by a link, $p^3$, having its length made adjustable by the right-and-left nut $p^4$, with a treadle, $p^5$, extending out at the front of the table, as shown in Fig. 1, in convenient position to be actuated by the foot of the operator of the machine. After one shelf of the rack is filled by the movement of the plunger-heads $o^3$, caused by the depression of the lever $p^5$, the said rack is fed downward to bring the next shelf into the proper position to receive the matches by the rack-feeding mechanism, shown as a friction-roller, $r$, mounted on an axle, $r'$, and having rigidly connected therewith a ratchet, $r^2$, engaged by a pawl, $r^3$, carried by an arm, $r^4$, mounted in guides $r^5$ upon the rear side of the pit $i$ of the rack. The said arm $r^4$ is connected by a link, $t$, with the treadle $p^5$, the said link being adjustable toward and from the fulcrum of the said treadle to vary the amount of movement of the pawl-carrying bar $r^4$, so as to cause it, in the downward movement of the treadle, to move over the proper number of teeth on the ratchet $r^2$, so that in the return-stroke of the treadle, caused by the spring $p^6$ or a counter-weight, it will rotate the friction-wheel $r$ a sufficient distance to carry the rack, the side piece, $k$, of which is in contact with the said roller, just the distance between the shelves $j$ of the said rack. After one of the shelves has been filled by a movement of the plungers and the rack moved to present the next shelf in line with the column of match-cards, more of the said cards are presented to the saw $e$ until the guideways $g g'$ are again filled solidly to the ends $g^2$ of the said guideways, when the plunger will again be operated and another shelf filled. The pressure of the roller $r$ against the rack may be regulated by adjusting-screws $r^6$, acting on the bearing-boxes of the arbor $r'$. When the entire rack is filled the nuts $m$ at the ends thereof are turned to press the end pieces, $k$, tightly against the columns of matches placed between them, thus holding the matches firmly during the subsequent process of dipping them in the sulphur or other composition used for igniting.

It is obvious that the herein-described automatic racking mechanism might be employed independently of the cutting-off and splitting saws, if desired, and that certain portions of this invention are applicable to the manufacture of parlor or single-splint matches. By having both the saw-arbors parallel with the main shaft they may be actuated therefrom by straight belts with economy of power, the arrangement being also very convenient for operation.

I claim—

1. An organized match sawing and racking machine composed of the following elements, namely: a main driving-shaft and a gang of splitting-saws, and a cutting-off saw upon arbors parallel with the said shaft and driven thereby, guideways leading from the said cutting-off saw, a rack guide or pit between the said guideways, and mechanism for introducing the matches from both of the said guideways into a rack contained in the said pit, substantially as described.

2. The cutting-off saw and guideways leading therefrom, combined with the pressers co-operating with the said guideways, and the rack guide or pit included between them, substantially as described.

3. The guideways and rack guide or pit between them, combined with series of stop projections and plungers at each side of the said rack-guide, and actuating mechanism for the plungers, substantially as described.

4. The guideways and rack guide or pit between them, combined with the match-inserting plungers, rack-feeding device, and actuating mechanism therefor, substantially as described.

5. The rack and match inserting plungers at each side thereof, combined with mechanism for actuating the said plunger and feeding the said rack, substantially as described.

6. The rack, its feeding-roller, and ratchet connected therewith, combined with the plungers, their actuating-treadle, and the pawl adjustably connected therewith and co-operating with the said rack-feeding ratchet, substantially as described.

In testimony whereof I have signed my name to this specification in the presence of two subscribing witnesses.

CHARLES B. GARDINER.

Witnesses:
BENJ. E. WOLCOTT,
ALFRED E. LINCOLN.